Feb. 12, 1924.
H. M. McCUNE
NONSKID DEVICE
Filed Feb. 13, 1922
1,483,102
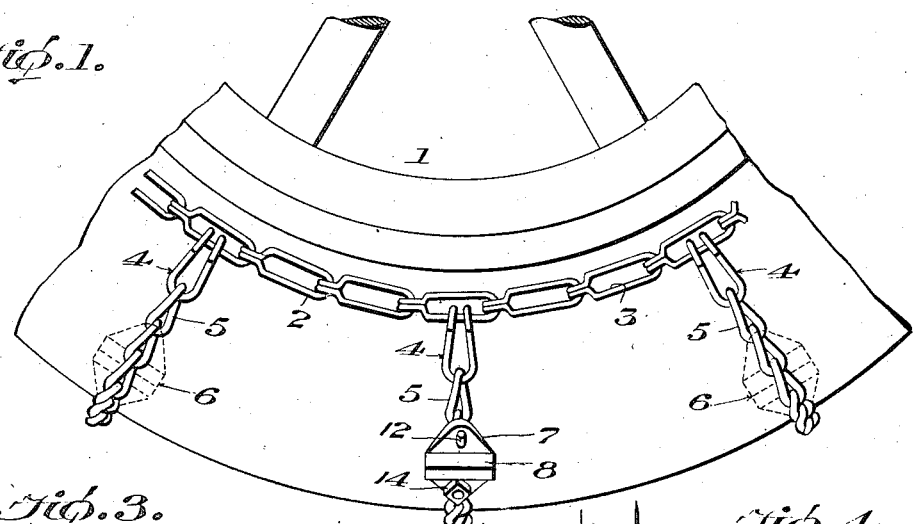
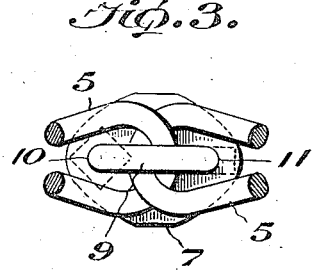
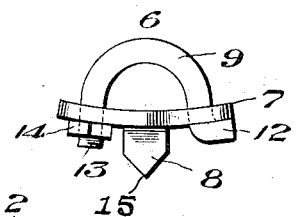
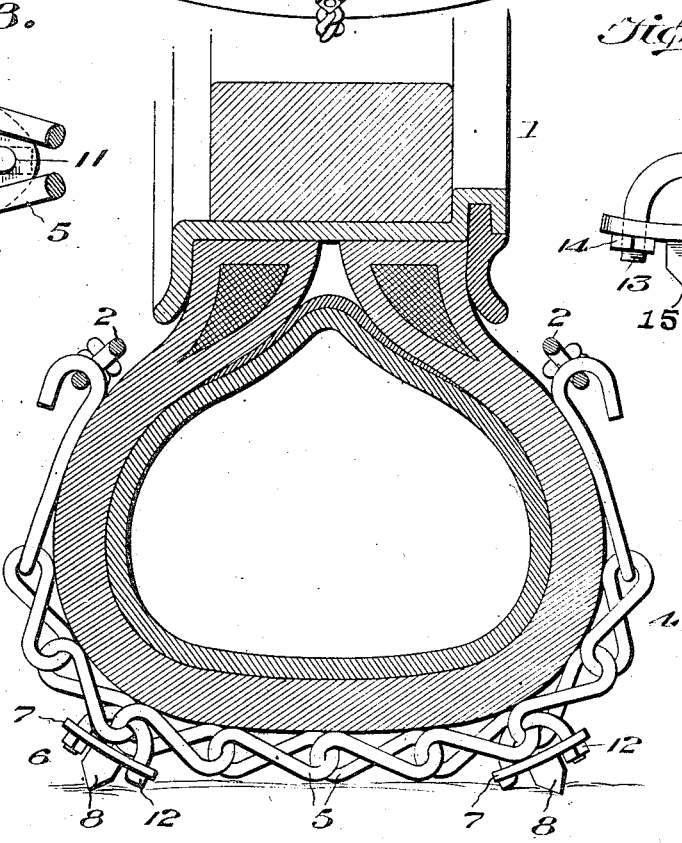
Inventor
Henry M. McCune
By A. L. Ely
Attorney Patented Feb. 12, 1924.

1,483,102

UNITED STATES PATENT OFFICE.

HARRY M. McCUNE, OF KENMORE, OHIO.

NONSKID DEVICE.

Application filed February 13, 1922. Serial No. 536,395.

*To all whom it may concern:*

Be it known that I, HARRY M. MCCUNE, of the city of Kenmore, county of Summit, and State of Ohio, have invented certain new and useful Improvements in Nonskid Devices, of which the following is a specification.

My invention relates to improvements in non-skid devices of the class adapted for attachment to resilient vehicle tires.

Tire chains and other non-skid devices fail, as a class, to provide sufficient security against skidding in a lateral direction, particularly, when they are used upon heavily loaded vehicles, such as trucks, and under adverse road conditions. They are also, as will be recognized, susceptible of improvement to insure a more positive engagement with the road surface to prevent racing of the wheel particularly under such conditions as mentioned above.

With the foregoing in mind, the present invention is directed primarily toward providing auxiliary means adapted to augment the gripping effect of various forms of chains now in use and to thereby positively obviate skidding or slipping of the wheel either in a lateral direction or otherwise.

It is also an object of this invention to provide such means adapted to be easily and quickly attached to non-skid devices of the chain link type in such relation thereto and to the wheel, that they are positively secured in their most effective position against displacement in operation.

Other and ancillary objects and advantages such as facility in removal, relatively low cost of manufacture, and adaptability for application to standard makes of chains, will become apparent when the following description is read in conjunction with the drawings accompanying and forming a part of this specification, and in which—

Fig. 1 is a fragmentary side elevational view illustrating the application of my invention to one type of non-skid device.

Fig. 2 is a transverse section, on an enlarged scale illustrating the arrangement of a plurality of calks on a transverse chain, and showing the tire under load.

Fig. 3 is a plan view, on a further enlarged scale and

Fig. 4 is a side elevational view of the device separated from the chain.

Referring to the drawings by numeral, 1 designates so much of a portion of a wheel and tire as will suffice to illustrate the application of my invention and 2 a preferred type of non-skid chain, equipped with the devices comprising my invention. The chain, per se, forms no part of the present invention. It is therefore sufficient to say that it comprises the usual side chains 3 and transverse chain 4 the latter being formed of twisted links 5.

The auxiliary non-skid device of my invention comprises, generally speaking, a calk designated, as a unit by the numeral 6, and as best shown in Figs. 2 and 3, it embodies component parts, presently described, whereby it is adapted for attachment to the transverse chains 4 of the type shown, or one similar thereto. It will be obvious that in order to embody any attachment with chains of this character, that the peculiar relative arrangement of the chain links may be considered, also their hinging action one upon the other, and their tendency to roll upon contact with the road. In order to provide for a secure attachment of the calk of my invention to the chains 4 and to affix them in such position relative thereto that they will be least affected by the above mentioned action and tendencies of the links I prefer to construct them for attachment at the juncture of two links. In the form of the invention which is shown, I attach each of them to two links at their hinging point, and in such relation thereto that the links prevent the calk from turning upon the chain.

To this end the calk 6 is constructed with a curvilinear portion or plate 7 adapted to bear against the adjacent links of the chain, a tooth portion 8 preferably disposed centrally and transversely of the plate, and a bail 9 for clamping the calk upon the chain. As best shown in Figs. 2 and 4 the bail 9 is substantially semi-circular in form and is adapted to span the tooth portion 8, and to be threaded through the ends of adjacent links of the chain, with its end portions secured in the plate, 7. To accomplish this arrangement I prefer to provide the plate with openings 10 and 11 at each end thereof for receiving the respective ends of the bail and to construct one end of the bail 9 with a lateral offset 12 designed to take under the plate and securely lock that end of the bail in place. The other end of the bail is threaded as at 13 and provided with a nut 14 whereby the calk is securely clamped against the links to which it is attached. The tooth portion, 8, as before stated, is preferably elongated and disposed transversely of the portion, 7. Preferably it is provided with a knife edge 15 and owing to the arrangement of the calk upon the chain it will be seen that the tooth portion is positioned to present its broad side for effective action against lateral skidding of the wheel.

As best shown in Fig. 2 of the drawings the calks of my invention are designed for attachment to their respective chains at a point thereon where they will be fully effective when the tire is under load. Furthermore by so positioning them they are presented in the flexed position of the tire, at an effective angle to the road, that is to say they are inclined in the direction of the side thrust of the wheel. Preferably and as shown in Fig. 1 one of these calks is attached to each transverse chain the calks of each chain being upon opposite sides of the wheel, although this arrangement may be varied as desired.

It will now be seen that my invention provides a practical non-skid attachment for chains of the character described and that it may be easily removed from the chain at will and secured thereon against accidental displacement therefrom. Furthermore by virtue of its construction, it may be secured at a point of maximum strength of the chain in such manner that it will be substantially unaffected by the action of the chain links during revolution of the wheel and always presented against the road surface in a position wherein it is most effective to prevent lateral skidding of the wheel. At the same time it provides a dependable means for augmenting the ground gripping action of the chains during rotation of the wheel.

Although I have necessarily described my invention in detail, it is to be understood that the present disclosure is merely illustrative and is not to be construed as restricting the scope or spirit thereof unless such restrictions are indicated in the claims appended hereto.

Claims:

1. A skid preventing device comprising, the combination with circumferential chains and spaced transverse chains connected to the circumferential chains and adapted to be received over a tire, a removable plate positioned over one of said transverse chains, a lug integral with the plate forming a side-skid preventing projection, and means passing through the plate and the chain and adapted to attach the plate in position on the chain.

2. The combination with a non-skid tire chain, comprising transverse link chains, of a calk constructed to be removably attached thereto, said calk embodying a bail adapted to be threaded through the bight of adjacent ends of links of a chain, to permit relative hinging movement of the links thereon.

3. The combination with a non-skid tire chain comprising transverse link chains, of a calk constructed to be removably attached thereto, said calk embodying a plate, and a bail adapted to be threaded through the bight of adjacent ends of links of a chain to clamp the plate against the links for relative hinging movement thereon.

4. The combination with a non-skid tire chain comprising transverse link chains, of a calk constructed to be removably attached thereto said calk embodying a plate, a tooth thereon, and a bail adapted to be threaded through the bight of adjacent ends of links of a chain to clamp the plate thereagainst for relative hinging movement thereon.

5. The combination with a non-skid tire chain comprising transverse link chains, of a calk constructed to be removably attached thereto said calk embodying a curvilinear plate, a laterally projecting tooth disposed transversely of the plate, and a bail adapted to be threaded through the bight of adjacent ends of links to clamp the plate against said links.

6. A calk for use with a non-skid chain comprising, a ground gripping element, and a bail adapted to be threaded through adjacent ends of links of the chain to removably clamp the calk on said links.

7. A calk for use with a non-skid chain comprising, a ground gripping element, and a bail adapted to be threaded through adjacent ends of links of the chain to removably clamp the calk on said links without affecting the free relative movement of said links.

8. In a device of the class described, the combination of a transverse tire chain, of a calk adapted to be placed on the chain, a U-shaped attaching bail passing through the calk and into the chain, the ends of the bail extending on the upper side of the calk and means on the upper side of the calk by which the bail may be secured.

9. In an article of the class described, the combination of a transverse tire chain, a calk adapted to be placed on the chain, an attaching device depending from the calk and means on the upper side of the calk to secure the device in place on the chain.

HARRY M. McCUNE.